United States Patent Office 3,319,313
Patented May 16, 1967

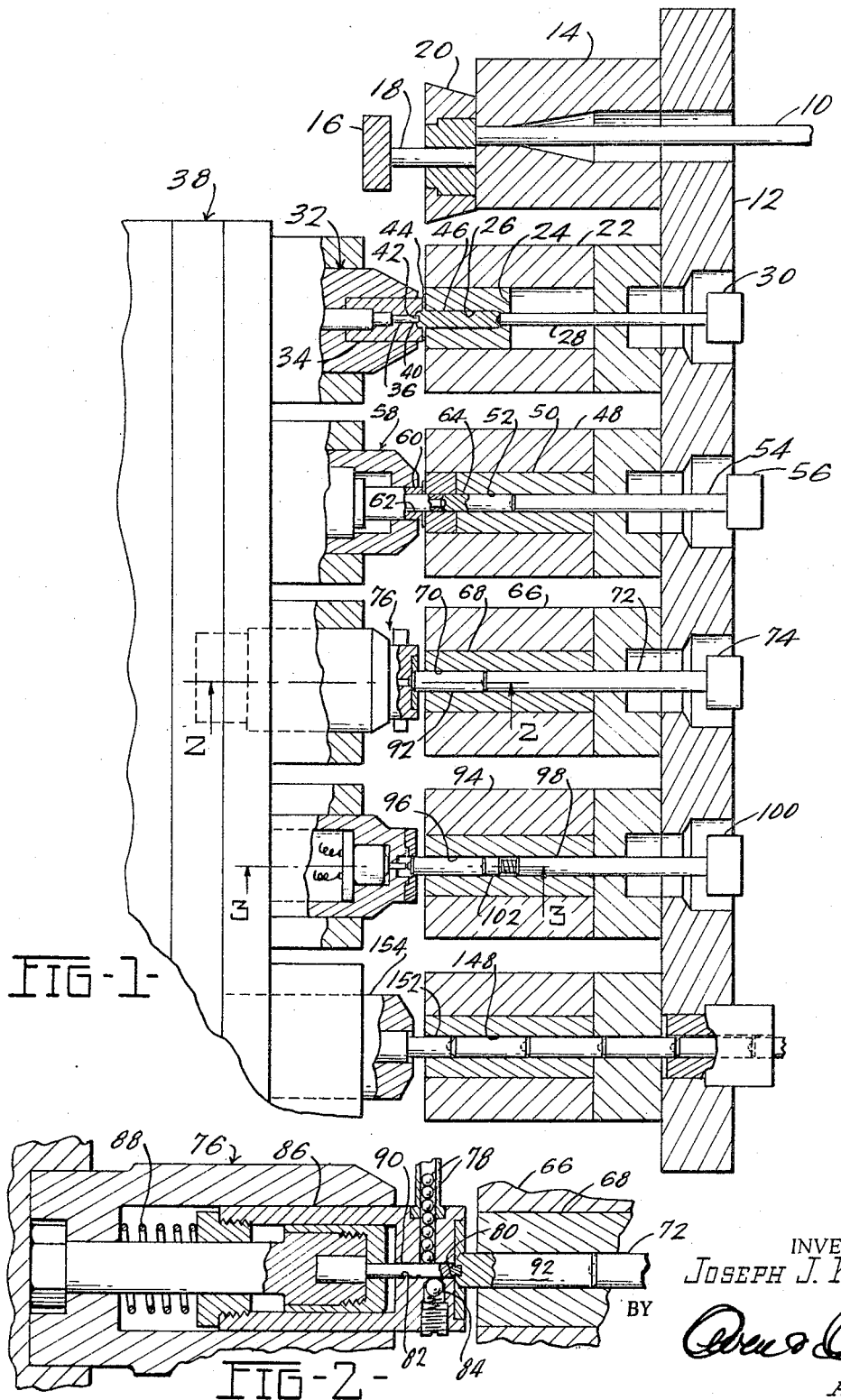

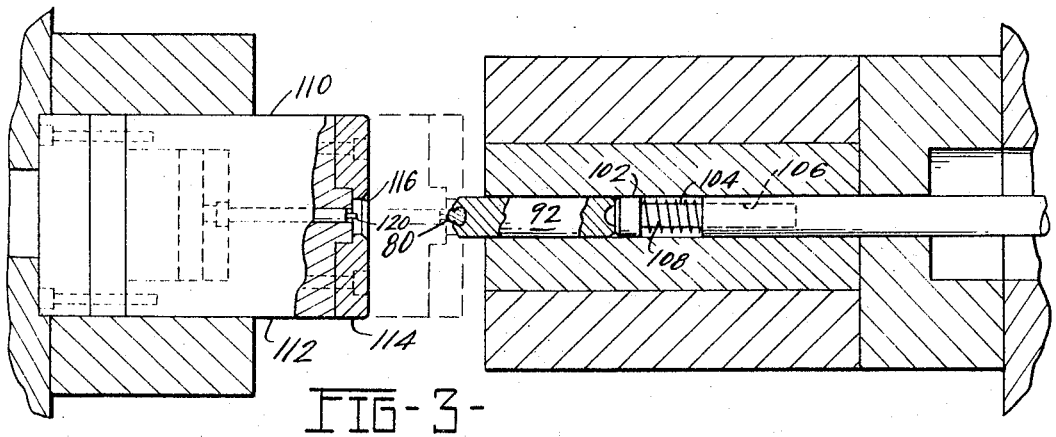
FIG-3-
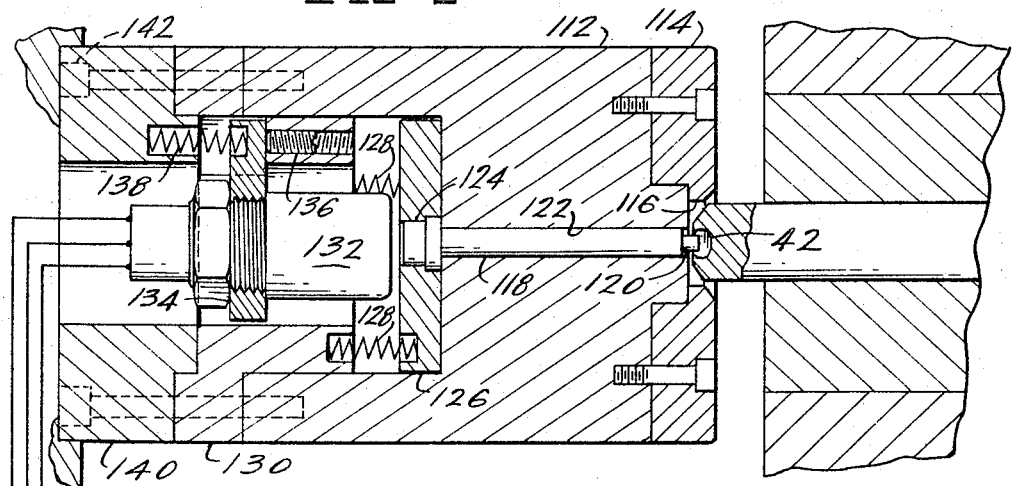
FIG-4-
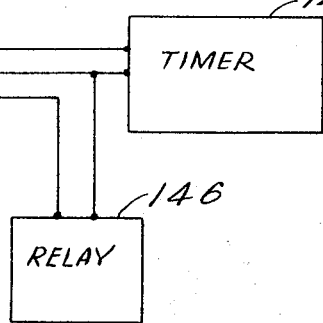
INVENTOR:
JOSEPH J. KURTZ.
BY
ATT'YS.

3,319,313
APPARATUS FOR MANUFACTURING STUDS
Joseph J. Kurtz, Lorain, Ohio, assignor to Gregory Industries, Inc., Lorain, Ohio, a corporation of Michigan
Filed Sept. 15, 1965, Ser. No. 487,522
15 Claims. (Cl. 29—34)

This invention relates to apparatus for manufacturing studs and more particularly to such apparatus including means for automatically inspecting the studs and for providing a suitable signal if a stud is defective.

Apparatus according to the present invention enables a stud to be made and inspected in a series of steps such that the stud comes off the machine as an inspected and finished product, with the possible exception of being washed or cleaned in some instances. The apparatus forms and shapes a stud from a piece of bar stock and also forms a recess in an end of the piece into which a body or ball of flux is inserted and shaped. The stud is then inspected to determine if the flux body has been properly assembled and, if not, a suitable signal is effected such as shutting down the machine. Consequently, every stud that does come off the machine is known to be in proper form and ready for use.

It is, therefore, a principal object of the invention to provide improved apparatus for making welding studs loaded with solid flux.

Another object of the invention is to provide apparatus for inspecting solid flux studs to determine if the flux body is properly assembled.

A further object of the invention is to provide apparatus for determining if a recess in a workpiece is properly filled and, if not, for shutting down a machine making the workpiece.

Other objects and advantages of the invention will be apparent from the following detailed description of a preferred embodiment thereof, reference being made to the accompanying drawings, in which:

FIG. 1 is a somewhat schematic view in horizontal cross section of a machine for making studs and for inspecting them in accordance with the invention;

FIG. 2 is a fragmentary, enlarged view in vertical cross section taken along the line 2—2 of FIG. 1;

FIG. 3 is a fragmentary, enlarged view with parts broken away and with parts in section, taken generally along the line 3—3 of FIG. 1; and FIG. 4 is an enlarged view in cross section of the apparatus shown in FIG. 3, along with a circuit used therewith.

Referring particularly to FIG. 1, a six station progressive-die or cold heading machine is shown schematically. This machine is described more fully in co-pending applications, Ser. No. 397,259, now Patent No. 3,269,000 and Ser. No. 467,535, of Joseph J. Kurtz et al. In the first of the stations, bar stock 10 is fed from a suitable source of supply through an opening in a bolster plate 12 and through a guide block 14 against a stop 16. A piece 18 of the bar stock of predetermined length is then severed by a cutter bar 20 which moves transversely to the guide block and shears the piece 18 from the stock 10.

The stock piece 18 is then transferred to a second station in which ends of the stud are shaped to some extent. The second station includes a die body or holder 22 supporting a first die 24 having a recess 26 therein. A first ejector pin 28 is aligned with the recess 26 and extends thereinto from behind the bolster plate 12. The ejector pin 28 has a suitable driving head 30 which can be driven by a cam and drive shaft combination (not shown) or other suitable mechanism. A first hammer 32 is aligned with the die recess 26 with the hammer including a heading die 34 and a punch 36. The hammer 32 is supported by a main ram 38 which is driven through a suitable crank or cam mechanism (not shown) to impart the required periodic motion to the hammer 32 and to other hammers to be subsequently discussed. The ejector pin 28 and the hammer 32 are operated in synchronism by their respective drive mechanisms.

The hammer 32 is held in a retracted position while the stock piece 18 is moved into alignment with the hammer and the die, after which the hammer is moved forwardly to force the stock piece into the die. The right end of the stock piece 18 is then rounded or beveled somewhat by the rounded die end, as shown. At the same time, the left end of the piece 18 is shaped by the heading die 32 to form a truncated, conical end 40 and a flux recess 42 is formed in the conical end 40 by the punch 36. A flash collar 44 is also formed in this instance as the conical end 40 is shaped.

A partly formed stock piece designated 46 is then transferred to a third station where the weldable or conical end of the stud is further shaped and the flash collar 44 is removed. The third station includes a second die body 48 having a second forming die 50 with a die recess 52. A second ejector pin 54 extends into the die 50 and also has a driving head 56. A second hammer 58 is located at the third station and this hammer includes a heading die 60 and a punch 62. When the stock piece 46 is moved between the die 50 and the hammer 58, the piece is pushed into the die recess 52 until reaching the ejector pin 54 to cause the collar 44 to be sheared from the piece. At this time, a pair of radially inwardly-extending crimps can be formed by the punch 62, on the end 40 of the stock piece, at the opening of the recess 42.

The further partially formed stock piece 64 is then transferred to a fourth station (see also FIG. 2) wherein flux is added to the weldable end 40 of the stud and shaped. The fourth station includes a die support 66 having a holder 68 with a recess 70. This station also includes an ejector pin 72 extending into the recess 70 to back up the stock piece 64 as a loading operation is performed. The ejector pin 72 also has a driving head 74 behind the bolster plate 12.

A hammer 76, in this instance, includes loading mechanism for ramming a flux body or ball 78 into the now-crimped recess 42, and for shaping the ball to produce a projecting conical portion 80 on the end of the flux. The balls 78 are fed sequentially to a loading passage 82 where they are held by a spring-loaded detent 84 until forced therebeyond. The passage 82 is in a slidable holder 86 which moves rearwardly when the hammer 76 is moved toward the die 68 and the force of a spring 88 is overcome. A loading and forming punch 90 in the passage 82 is held in a fixed position by a supporting rod 92 so that when the punch 90 moves relative to the passage 82 by rearward movement of the holder 86, the punch moves one of the flux balls 78 into the stud recess 42. The loading and shaping of the flux 78 completes the manufacturing operations on the stud in the cold heading machine.

A now-finished stud 92 complete with the flux 80 is transferred to the inspection station which constitutes the fifth station of the cold heading machine. A stud holder 94 with a stud-receiving recess 96 positions the stud and supports it during inspection. The station includes an ejector pin 98 having a driving head 100 and a yieldable end 102. The yieldable end 102 includes a shank 104 extending into a recess 106 and a heavy spring 108 urging the end outwardly. This enables the ejector pin to accommodate slight differences in stud lengths.

The inspection station also includes an inspection head 110 which has a main body 112 and an end cap 114 forming a recess 116 for receiving the flux end of the stud 92. An inspection probe 118 having a reduced end 120 capable of fitting into the crimped recess 42 of the stud, if the recess is empty, is slidably mounted in a passage 122 of the body 112. The probe 118 has an enlarged head 124 mounted in a back-up plate 126 which is yieldably connected by springs 128 to a mounting member 130 constituting part of the head 110. A detecting or sensing device 132 is threadably mounted in a yieldable plate 134 which bears against the mounting member 130 and can be adjustably supported with respect thereto by setscrews 136. In this manner, the position of the detecting device can be adjusted relative to the probe 118 to obtain the desired results. The mounting plate 134 is urged forwardly by springs 138 located between the plate 134 and an end member 140 of the head 110. The end member 140, the mounting member 130, and the main body 112 are assembled by suitable machine screws 142.

The detecting device 132, as shown, is magnetically sensitive and is energized to close a circuit when the magnetic probe 118 is moved rearwardly. This occurs when the inspection head 110 is moved against the stud 82 and the probe end 120 engages the tip of the solid flux 80 in the stud 92. By way of example, the detecting device 132 can be obtained from the Micro Switch Division of Minneapolis Honeywell Company, Freeport, Illinois, under the catalog No. 205FS1. If there is no solid flux in the recess 42, the probe 118 remains in the position shown in FIG. 4 with the rear end spaced from the detecting device 132 and the device is not actuated or energized.

Each time the detecting device 132 is energized, it resets a timer 144 which immediately begins timing out each time it is re-set. The timer 144 can be of many suitable styles such as a Ducas timer Model 4000-A. If the timer 144 does time out, it opens a relay 146 which cuts the power to the cold heading machine and immediately stops it. However, the timer is set to time out after a period of time which is more than enough to complete one cycle on the machine, one cycle being defined as the movement of the stock piece or stud to a station and the performance of the operation on the stud at that station. However, the period of time is less than that required to complete two cycles. Stated another way, the timing period exceeds the time elapsing between the inspection of one stud and the next sequential stud but is less than the time elapsing between the inspection of one stud and the second sequential stud. Hence, in the event that each stud has the flux 80 properly inserted therein, the timer is re-set each time one of the studs is brought to the inspection station and the probe 118 energizes the detecting device 132. Consequently, the timer is re-started before it can time out and the machine keeps running. However, in the event that a ball is not seated in the recess 42, the detecting device 132 will not be energized when that stud is brought to the inspection station with the result that two cycles would elapse before the detecting device 132 would be energized again, assuming the next stud is properly assembled. In the meantime, however, the timer 144 will have timed out and shut down the machine. The operator then knows immediately that a defective stud is present and this stud is removed and disposed of.

The probe 118 is not absolutely essential to the inspection station 110 since the detecting device 132 can be placed adjacent the flux end of the stud 92. However, by locating the device 132 further back in the head 110 and using the probe 118, the device is more fully protected against damage and dirt.

Of course, other detecting devices can be used in place of the magnetic device, including a microswitch, which can be closed by the probe 118 each time it senses a body of flux and moves rearwardly in the head 110.

After leaving the inspection station, the now finished and inspected stud 92 is transferred to a final, sixth station where it is pushed through an exit passage 148 in a holder 150 by means of a push rod 152 held by a hammer member 154. The studs can then be cleaned, if necessary, and packaged without any other steps or operations.

Various modifications of the above described embodiments of the invention will be apparent to those skilled in the art, and it is to be understood that such modifications can be made without departing from the scope of the invention, if they are within the spirit and tenor of the accompanying claims.

I claim:

1. Apparatus for manufacturing a slug-loaded stud to be welded to a surface, said apparatus comprising means for severing a piece of bar stock of predetermined length, means for forming a truncated conical end on one end of said piece, means for piercing a flux recess in the conical end of said piece, means for crimping said flux recess, means for feeding a body of flux partly into said recess and for shaping a projecting part of said body to a predetermined shape, sensing means, means for moving said sensing means toward the piece after the piece is subjected to said feeding and shaping means, and means responsive to said sensing means for stopping operation of the apparatus if the flux recess is empty.

2. Apparatus according to claim 1 characterized by a timer which is re-set each time the sensing means senses a filled recess and which times out after the sensing means senses an empty recess.

3. Apparatus for manufacturing a slug-loaded stud to be welded to a surface, said apparatus comprising means for severing a piece of bar stock of predetermined length, means for forming a truncated conical end on one end of said piece, means for forming a flux recess in the conical end of said piece, means for feeding a body of flux partly into said recess and for shaping the projecting part of said body to a predetermined shape, sensing means, means for moving said sensing means toward the piece after the piece is subjected to said feeding and shaping means, and means responsive to said sensing means for stopping operation of the apparatus if the flux recess is empty.

4. Apparatus for manufacturing a slug-loaded stud to be welded to a surface, said apparatus comprising means for severing a piece of bar stock of predetermined length, means for forming a flux recess in an end of said piece, means for feeding a body of flux partly into said recess and for shaping the projecting part of said body, probe means, means for moving at least one of said probe means and said piece toward the other after the piece is subjected to said feeding and shaping means, and means responsive to said probe means for producing a signal if the flux recess is empty.

5. In a machine for manufacturing slug-loaded studs including means for moving a body of solid flux partly into a recess in an end of the stud and for shaping a projecting portion of said body, inspection means for determining if the body is properly inserted in said recess comprising means for holding a portion of the stud end opposite the recess end including resilient means urged against the held end of the stud, an inspection head including a main body forming a recess to receive the recessed end of the stud, a probe movably carried by said main body and having an end extending centrally into said body recess and adapted to extend into the stud recess if not filled with the body of flux, mounting means affixed to said probe and urging said probe toward the stud holding means, a sensing device, means resiliently and adjustably mounting said sensing device behind said probe, said sensing device being energized when said probe is moved toward said device when the body of flux is in the stud recess, timing means adapted to be re-set to start a new timing period each time said sensing device is energized, and switch means operated by said timing means to shut off the machine each time the timing means times out, the timing period of said timing means being longer than the time elapsing between the inspection of two sequential studs by said inspecting means and shorter than the time elapsing between the inspection of a stud and the second sequential stud.

6. In a machine for manufacturing slug-loaded studs including means for moving a body of solid flux partly into a recess in an end of the stud and for shaping a projecting portion of said body, inspection means for determining if the body is properly located in said recess comprising means for holding a portion of the stud end opposite the recess end, an inspection head including a main body forming a recess to receive the recessed end of the stud, a probe movably carried by said main body and having an end extending centrally into said recess and adapted to extend into the stud recess if not filled with the body of flux, mounting means affixed to said probe and urging said probe toward the stud holding means, a sensing device, means mounting said sensing device behind said probe, said sensing device being energized when said probe is moved toward said device when the body of flux is in the stud recess, timing means adapted to be re-set to start a new timing period each time said sensing device is energized, and switch means operated by said timing means to shut off the machine each time the timing means times out, the timing period of said timing means being longer than the time elapsing between the inspection of two sequential studs by said inspecting means and shorter than the time elapsing between the inspection of a stud and the second sequential stud.

7. In a machine for manufacturing slug-loaded studs including means for moving a body of solid flux partly into a recess in an end of the stud and for shaping a projecting portion of said body, inspection means for determining if the body is properly located in said recess comprising means for holding a portion of the stud end opposite the recess end, an inspection head forming a recess for the recessed end of the stud, sensing means energized when the body of flux is in the stud recess, timing means adapted to be re-set to start a new timing period each time said sensing means is energized, and switch means operated by said timing means to shut off the machine each time the timing means times out, the timing period of said timing means being longer than the time elapsing between the inspection of two sequential studs by said inspecting means and shorter than the time elapsing between the inspection of a stud and the second sequential stud.

8. In a machine for manufacturing slug-loaded studs including means for moving a body of solid flux partly into a recess in an end of the stud and for shaping a projecting portion of said body, inspection means for determining if the body is properly inserted in said recess comprising means for holding a portion of the stud end opposite the recess end including resilient means urged against the held end of the stud, an inspection head including a main body forming a recess to receive the recessed end of the stud, a probe movably carried by said main body and having an end extending centrally into said body recess and adapted to extend into the stud recess if not filled with the body of flux, mounting means affixed to said probe and urging said probe toward the stud holding means, a sensing device, means resiliently and adjustably mounting said sensing device behind said probe, said sensing device being energized when said probe is moved toward said device when the body of flux is in the stud recess, timing means adapted to be re-set to start a new timing period each time said sensing device is energized, and means operated by said timing means to indicate a defective stud each time the timing means times out.

9. In a machine for manufacturing slug-loaded studs including means for moving a body of solid flux partly into a recess in an end of the stud and for shaping a projecting portion of said body, inspection means for determining if the body is properly located in said recess comprising means for holding a portion of the stud end opposite the recess end, an inspection head including a main body forming a recess to receive the recessed end of the stud, a probe movably carried by said main body and having an end extending centrally into said recess and adapted to extend into the stud recess if not filled with the body of flux, mounting means affixed to said probe and urging said probe toward the stud holding means, a sensing device, means mounting said sensing device behind said probe, said sensing device being energized when said probe is moved toward said device when the body of flux is in the stud recess, timing means adapted to be re-set to start a new timing period each time said sensing device is energized, and means operated by said timing means to indicate a defective stud each time the timing means times out.

10. In a machine for manufacturing slug-loaded studs including means for moving a body of solid flux partly into a recess in an end of the stud and for shaping a projecting portion of said body, inspection means for determining if the body is properly located in said recess comprising means for holding a portion of the stud end opposite the recess end, an inspection head forming a recess for the recessed end of the stud, sensing means energized when the body of flux is in the stud recess, timing means adapted to be re-set to start a new timing period each time said sensing means is energized, and means operated by said timing means to indicate a defective stud each time the timing means times out.

11. In a machine for manufacturing slug-loaded studs including means for moving a body of solid flux partly into a recess in an end of the stud and for shaping a projecting portion of said body, inspection means for determining if the body is properly inserted in said recess comprising means for holding a portion of the stud end opposite the recess end including resilient means urged against the held end of the stud, an inspection head including a main body forming a recess to receive the recessed end of the stud, a probe movably carried by said main body and having an end existing centrally into said body recess and adapted to extend into the stud recess if not filled with the body of flux, mounting means affixed to said probe and urging said probe toward the stud holding means, a sensing device, means resiliently and adjustably mounting said sensing device behind said probe, said sensing device being energized when said probe is moved toward said device when the body of flux is in the stud recess, and means operated by said sensing device to indicate the presence of a defective stud.

12. In a machine for manufacturing slug-loaded studs including means for moving a body of solid flux partly into a recess in an end of the stud and for shaping a projecting portion of said body, inspection means for determining if the body is properly located in said recess comprising means for holding a portion of the stud end opposite the recess end, an inspection head including a main body forming a recess to receive the recessed end of the stud, a probe movably carried by said main body and having an end extending centrally into said recess and adapted to extend into the stud recess if not filled with the body of flux, mounting means affixed to said probe and urging said probe toward the stud holding means, a sensing device, means mounting said sensing device behind said probe, said sensing device being energized when said probe is moved toward said device when the body of flux is in the stud recess, and means operated by said sensing device to indicate the presence of a defective stud.

13. In a machine for manufacturing slug-loaded studs including means for moving a body of solid flux partly into a recess in an end of the stud and for shaping a projecting portion of said body, inspection means for determining if the body is properly located in said recess comprising means for holding a portion of the stud end opposite the recess end, an inspection head forming a recess for the recessed end of the stud, sensing means energized when the body of flux is in the stud recess, and means operated by said sensing device to indicate the presence of a defective stud.

14. In a cold heading machine for manufacturing solid flux studs including means for moving a body of solid flux partly into a recess in an end of the stud and for shaping a projecting portion of said body, inspection means for determining if the body is properly located in said recess comprising means for holding said stud in a predetermined position, a probe movably positioned relative to said holding means and having an end adapted to extend centrally into the recess if empty, sensing means mounted behind said probe, said sensing means being energized when said probe is moved toward said sensing means, and means responsive to said sensing means to indicate the presence of a defective stud if said sensing means is not energized within a predetermined period of time.

15. In a cold heading machine for manufacturing solid flux studs including means for moving a body of solid flux partly into a recess in an end of the stud and for shaping a projecting portion of said body, inspection means for determining if the body is properly located in said recess comprising means for holding said stud in a predetermined position, sensing means movably positioned relative to said holding means and having means adapted to extend centrally into the stud recess if empty, sensing means mounted behind said probe, said sensing means being energized when said probe is moved toward said sensing means, and means responsive to said sensing means to indicate the presence of a defective stud if said sensing means senses an empty recess.

No references cited.

RICHARD H. EANES, Jr, *Primary Examiner.*